United States Patent [19]

Harris

[11] Patent Number: 5,059,666

[45] Date of Patent: Oct. 22, 1991

[54] ENAMINE KETONE AND ENONESULFIDE POLYMER SYSTEMS

[75] Inventor: Frank W. Harris, Akron, Ohio

[73] Assignee: Edison Polymer Innovation Corporation, Broadview Heights, Ohio

[21] Appl. No.: 534,449

[22] Filed: Jun. 6, 1990

[51] Int. Cl.$^5$ ............................ C08F 26/06; C08F 38/00; C08G 12/00
[52] U.S. Cl. ................................. 526/263; 526/285; 528/226; 528/228
[58] Field of Search ............... 526/285, 263; 528/229, 528/226

[56] References Cited

U.S. PATENT DOCUMENTS 4,331,786  5/1982  Foy et al. ........................... 525/408
4,663,483  5/1987  Hergenrother et al. ............ 564/396

OTHER PUBLICATIONS

Hackh's Chemical Dictionary; 4th Ed., McGraw-Hill; N.Y. (1969), pp. 27, 62.

*Primary Examiner*—Joseph L. Schofer
*Assistant Examiner*—M. Nagumo
*Attorney, Agent, or Firm*—D. Peter Hochberg; Mark Kusner; Louis J. Weisz

[57] ABSTRACT

Enamine ketone and enonesulfide polymeric solids are prepared by reacting liquid or low-melting propynone terminated enamine ketone and enonesulfide prepolymers in one-step, or more preferably, in two-step processes. Properties of the resulting polymers are determined by the nature of the reactant selected and by the relative amounts of reactants employed. Where the prepolymers formed possess terminal propynone groups, the prepolymers can subsequently be cross-linked. Copolymers can also be formed by reacting the prepolymers of the invention with vinyl-type monomers to form polymers with cross-linked networks. The polymerization techniques disclosed can be employed to produce thermoplastic, thermoset, and elastomeric products, and they are especially useful in reaction injection molding processes, in adhesive systems, in composite formations, for linings, and gaskets which require chemical resistance.

12 Claims, No Drawings

ENAMINE KETONE AND ENONESULFIDE POLYMER SYSTEMS

In co-pending application Ser. No. 368,802 allowed for "Moldable and/or Extrudable Poly (Enamine Ketone-Co-Alkylene Ether) Block Copolymers" certain novel copolymers that yield moldable and shapable block copolymers are described.

TECHNICAL FIELD

This invention, relates to still other enamine ketone and to enonsulfide polymeric materials useful in a variety of applications. More particularly, this invention relates to the synthesis of enamine ketone and enonsulfide polymers from solventless, liquid polymerization systems, especially from two-component solventless, liquid systems. Specifically, this invention includes the synthesis of polymers useful for reaction injection molding and other applications facilitated by the use of liquid or low-melting, propynone-terminated, enamine ketone and enonsulfide prepolymers that are prepared from liquid or low-melting diamines or dithiols, in one, more preferably two steps, some of the products of which can subsequently be cross-linked to form desired solid polymers.

BACKGROUND OF THE INVENTION

There are many applications for polymers prepared from components by polymerization reactions that can be conducted at relatively low temperatures, for example, at or below ambient temperatures, and that proceed without the evolution of volatile byproducts. Such polymers can be used, for example, for the manufacture of large plastic parts without the necessity of providing special techniques and apparatus for removing volatiles from the reaction in order to avoid undesirable product porosity.

In addition the elimination of any need to employ curing agents, catalysts, and the like to procure satisfactory curing of the desired polymers is of significant advantage.

While some processes that display such characteristics, for instance, nucleophilic additions to epoxides and isocyanates are widely used, the reactions thus obtained have the disadvantage of being susceptible to a number of competing side reactions that diminish their attractiveness. In this regard, isocyanate compounds are susceptible to dimerization reactions, while epoxides experience a variety of reactions that make them useful chiefly in applications that require thermosetting resins.

Furthermore, it is frequently of considerable advantage if the reacting components of a polymerization system are of a liquid or low-melting type, such characteristic assuring that their mixing and application can be accomplished with minimal difficulty. This is of particular importance where the components of the polymerization system are to be employed, for example, in high-speed, reaction injection molding (RIM) processes. Liquid polymerization components are also of considerable benefit in adhesive applications, in fabricating composite products, and in many other areas.

BRIEF DESCRIPTION OF THE INVENTION

In view of the foregoing, therefore, it is a first aspect of this invention is to provide two-component liquid enamine ketone or an enonsulfide polymerization systems.

A second aspect of this invention is to provide liquid enamine ketone and enonsulfide polymerization systems that eliminate the evolution of volatile byproducts.

Another aspect of this invention is to provide polymerization systems that employ liquid or low-melting components that are characterized by viscosities that lend such components to reaction injection molding processes, to use in adhesive systems, for making composites, and for a wide variety of other uses.

Another aspect of this invention is to provide a polymerization system that can be cured simply by the application of heat, and at relatively low temperatures.

A further aspect of this invention is to provide reactive components that can be polymerized to their final polymeric solid state in the absence of solvents, and without the addition of cure-promoting agents.

An additional aspect of this invention is to provide polymeric systems that can be adjusted to make thermoplastic, thermosetting, or elastomeric polymers by the use of suitable components, and by adjustment of their stoichiometric ratios relative to each other.

Still another aspect of this invention is to provide polymer systems involving the nucleophilic addition of appropriate compounds to bispropynones.

Yet a further aspect of this invention is to make copolymers from enamine ketone and enonsulfide prepolymers by polymerizing vinyl-type monomers therewith.

The preceding and other aspects of this invention are provided by a method for synthesizing an enamine ketone polymer comprising initially preparing a liquid propynone-terminated prepolymer compound by reacting a bispropynone with a member of the group of a diamine compound and a dithiol compound, subsequently cross-linking said prepolymer compound in the absence of solvents by causing acetylene end groups of said prepolymer compound to interact to form cross-links, thereby producing a desired polymeric product.

The preceding and other aspects of the invention are provided by a method for synthesizing an enamine ketone polymer comprising initially preparing a liquid propynone-terminated prepolymer compound by reacting a bispropynone with a member of the group of a diamine compound and a dithiol compound, and thereafter reacting said prepolymer compound with an additional amount of a liquid member of said group to produce a desired polymeric product.

The preceding and still other aspects of the invention are produced by a method for synthesizing an enamine ketone polymer comprising initially preparing a liquid propynone terminated prepolymer compound by reacting a bispropynone with a member of the group of a diamine compound and a dithiol compound; thereafter reacting said prepolymer compound with an additional amount of a liquid member of said group to produce a chain-extended prepolymer compound, and subsequently cross-linking said chain-extended prepolymer compound in the absence of a solvent by causing acetylene end groups of said chain-extended prepolymer compound to interact to form cross-links, thereby producing a desired polymeric product.

The preceding and additional aspects of the invention are provided by a reaction injection molding process in which a liquid propynone terminated prepolymer compound prepared by reacting a bispropynone with a member of the group of a diamine compound and a dithiol compound is mixed with an additional amount of a liquid member of said group, and the mixture is injected into a mold.

The preceding and still other aspects of the invention are provided by a composition produced by initially preparing a propynone terminated prepolymer compound by reacting a bispropynone with a diamine that includes a butyl nitrile rubber, and subsequently cross-linking said prepolymer compound by causing acetylene end groups of said extended prepolymer compound to interact to form cross-links, thereby producing a desired polymeric product.

The preceding and still additional aspects of the invention are provided by a method for synthesizing enamine ketone and enonsulfide copolymers comprising preparing a propynone-terminated prepolymer by reacting a bispropynone with a member of the group of a diamine compound, and a dithiol compound, and subsequently reacting the prepolymer with a vinyl-type monomer selected from the group of vinyl chloride, acrylonitrile, an acrylate, styrene, and derivatives of said monomers, to form a cross-linked copolymer.

DETAILED DESCRIPTION OF THE INVENTION

The concept of the invention involves the addition of diamines or dithiols to bispropynones, i.e., diethynyl ketones in a Michael reaction to yield chain extended compounds, both ends of which are terminated with ethynyl ketone end groups. In many cases, the triple bonds of the acetylenic groups can subsequently be interacted to provide polymer cross-linking.

In an especially preferred embodiment of the invention, the diamine or dithiol is added in two steps. By using the latter, preferred technique, the initial reaction provides a prepolymer that is still sufficiently liquid or low melting to be made readily flowable. The final prepolymer can then be formed by the addition of the balance of the diamine or dithiol, also liquid or low melting, to produce the prepolymer whose end groups frequently can be subsequently cross-linked by the application of heat to provide a solid polymer product. Since all the components in the two steps procedure are maintained in a liquid form until the reaction producing the solid polymer is complete, the two step procedure provides notable advantages, for example, in RIM pultrusions, coating operations, and in other applications, as will be described more particularly in the following.

The nucleophilic addition reaction proceeds as shown:

them can be employed in carrying out the reaction, depending upon the nature of the physical properties desired in the final polymeric product. Furthermore, and also as described more particularly in the following, the relative molecular amounts of bispropynone to its co-reactant may be adjusted to significantly alter the nature of the product formed.

While the liquid oligomers, including those whose ethynyl ketone end groups are cross-linked to provide the product polymer, undergo polymerization to form solid products in a liquid, solventless system, it is sometimes of advantage to prepare the initial prepolymers employed in the process of the invention in the presence of a solvent since the components that react to form the initial prepolymers are often rather viscous. After the initial prepolymer has thus been prepared, the solvent is stripped from the material, and the prepolymer, i.e., the bispropynone extended by the Michael addition of a dithiol or diamine can be stored, preferably at reduced temperature, i.e., at or below 5° C., to avoid premature cross-linking.

Where the preferred two-step process is employed, the prepolymer thus formed has additional diamine or dithiol added thereto prior to final polymerization, i.e., by the cross-linking treatment or other molecular interaction.

In preparing the prepolymers of the invention, it is preferable to add the diamine or dithiol to the bispropynone in a manner such that the bispropynone is maintained in molecular excess until the reaction is complete, thereby assuring more uniform molecular weight of the prepolymer molecules formed.

Bispropynones of the type with which the invention is concerned are those having the structural formula:

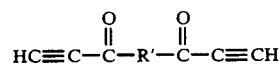

where R' may be alkylene, cycloalkylene, alkylene ether, and mixtures thereof, and which may contain functional side groups, saturated or unsaturated, and which may also contain cyano, halogen or other functional components. It has been found desirable for R' to contain from about 4 to 20 carbon atoms, and where unsaturation is present, to be preferable that such unsaturation be of a non-conjugated type.

Among useful bispropynones, i.e., diethynyl ketones, may be mentioned compounds in which R' is propylene,

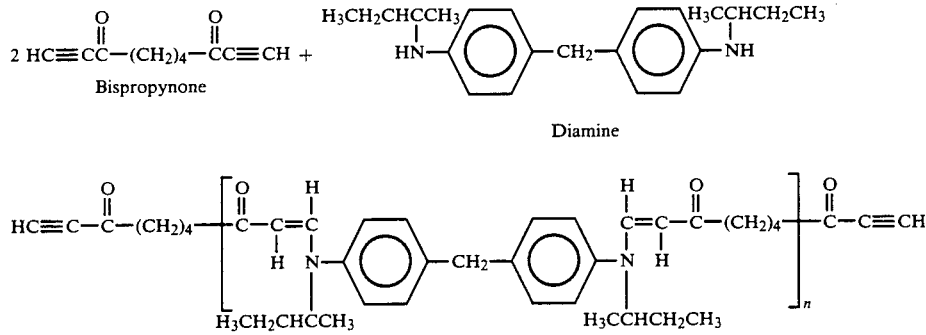

Liquid Bispropynone Oligomer

While the use of a diamine is illustrated, as previously indicated, either dithiols or diamines, and mixtures of —(CH$_2$)$_3$—; butylene, —(CH$_2$)$_4$—; octylene, —(CH$_2$)$_8$—; diglycolic, —(CH$_2$—O—CH$_2$)— or other groups.

Particularly preferred, however, are bispropynones in which R' is butyl or octyl.

Suitable diamines include hindered primary and secondary diamines of the general formula:

Amine-R²-Amine where R² is alkylene, cycloalkylene, arylene or mixtures of them, and which may also contain ether, amide, or thiol linkages.

While any of a wide variety of diamine compounds are useful for purposes of the invention, typical examples of suitable compounds include those manufactured by Universal Oil Product Company, for example, Unilink 4100, Unilink 4200 and Unilink 8100:

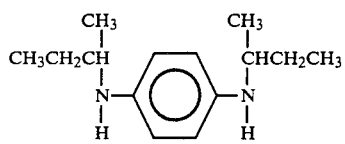

Unilink 4100

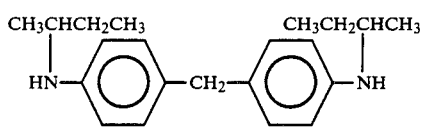

Unilink 4200

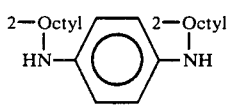

Unilink 8100

Other useful diamines include those manufactured by Ethyl Corporation, for instance, under the tradenames Ethacure 100 and Ethacure 300:

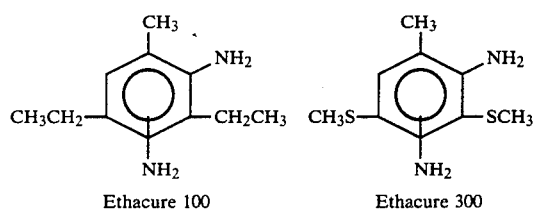

Ethacure 100     Ethacure 300

Still other suitable compounds include Jeffamine EDR-148 marketed by Texaco Chemical Company:

$H_2N-CH_2-CH_2-O-CH_2-CH_2-O-CH_2-CH_2-NH_2$

Also useful is 2,4,4-trimethyl heptane-1,7-diamine:

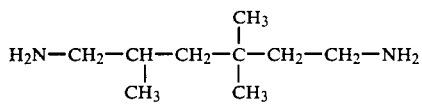

and mixtures of the 2,4,4 and 2,2,4 isomers of the preceding.

Other compounds that may be employed include Polamine 1000 and 2000, different molecular weight amines, produced by Polaroid Chemical Company having the following formula:

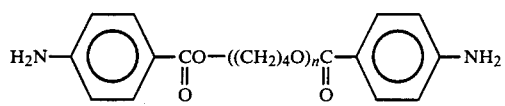

Additional suitable compounds include BAP 750 and 1100, different molecular weight amines, manufactured by BASF Company having the formula:

$H_2N-(CH_2)_3O[-(CH_2)_4O-]N(CH_2)_3NH_2$

Other useful compounds include dipiperazine

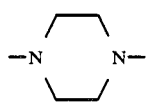

or compounds having the following structural formula:

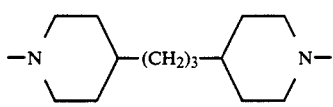

Also found useful, particularly in forming polymers having elastomeric characteristics are butyl nitrile diamines, for example, of the type sold by the B. F. Goodrich Company under the name Hycar. Such compounds have the formula:

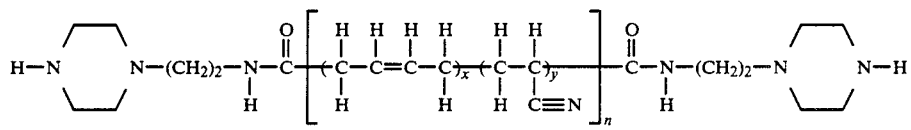

where "n" is a whole number, and x=1 and y=0 to 0.5, to indicate the relative abundance of the two groups in the repeating unit.

Among suitable dithiols may be mentioned those of formula:

thiol-R³-thiol where R³ is aliphatic, aromatic, or mixtures thereof, and when unsaturation is present, such unsaturation preferably being of the non-conjugated type. Among such dithiols may be mentioned 1,2-ethanedithiol and 1,4-butanedithiol, although other dithiol compounds are equally useful.

With respect to side chains appended to the "backbone" of the bispropynones, diamines, and dithiols described in the preceding, such side chains may include halogens, sulfides, chelated metal ions, cyano and additional groups.

The prepolymers formed as described, can have molecular weights of from about 300 to 15,000 or higher, molecular weights of from about 300 to 10,000 being preferred. The intrinsic viscosity of such polymers typically will be no greater than 1, however, intrinsic viscosities of from about 0.1 to 0.6 have been found to be of particular advantage.

As previously mentioned, the diamines suitable for use in the invention may comprise single diamines, mixture of diamines, or in the case of prepolymers formed with dithiols, single dithiols, mixture of dithiols, or mixtures of dithiols and diamines. In addition the bispropynones themselves may be mixtures of diethynyl ketones.

As described in the preceding, it is sometimes of advantage to synthesize the prepolymers of the invention in the presence of a solvent in order to facilitate their mixing and manipulation. In such cases, it is desirable that the solvents employed be of a neutral or acidic type since basic solvents have a tendency to attack the triple bonds present. It is also desirable that the solvents be relatively low boiling to allow their easy removal from the prepolymers, following the latters' formation. Among suitable solvents may be mentioned methylene dichloride, chloroform, acetonitrile, methylethylketone, ethers, or equivalent solvents.

While different amounts of solvents may be employed, it has been found convenient to prepare solutions of both the bispropynones, and the diamines or dithiols so that the same contain from about 20% to about 60% by weight of solids; a solution containing from about 25% to 35%, by weight, being typical.

The reactions employed to produce the diamine and dithiol extended bispropynone prepolymers of the invention may be carried out at temperatures no greater than about ambient, a significant advantage of the invention, although it is sometimes desirable to heat the reaction components when heating facilitates either melting, or a reduction in viscosity, thus allowing the materials to flow and mix more readily. While solvents are sometimes used to facilitate mixing, where suitable high speed mixing equipment is used in combining the liquid reactants, solvents are frequently unnecessary.

As described, in many applications such as reaction injection molding processes, it is desirable to carry out the formation of the diamine and dithiol extended bispropynone materials to be cross-linked in two steps in order to maintain the reacting components in the liquid state. In this regard, an initial or intermediate prepolymer is formed by adding only a portion of the diamine or dithiol to the dispropynone, thereby maintaining the prepolymer in a liquid state. Thereafter the balance of the diamine or dithiol is combined with the initial prepolymer, for example, immediately preceding introduction of the prepolymer into the mold. Following introduction of the final portion of the dithiol or diamine and the introduction of the mixture into the mold, if required, the final prepolymer may be cross-linked by being heated in the mold to form the solid polymer.

The two-step technique also lends itself to manufacturing adhesives since a liquid prepolymer system allows the components to be maintained in a desirably fluid state and applied as a fluid to the objects to be adhered. Prepolymers formed from the Unilink series of diamines, for example, are flowable viscous liquids, while those formed from the Ethacure series are semi-solids which flow at about 40° C.

Following formation of the final prepolymer, and where a substantial number of terminal triple bonds remain in the form of ethynyl ketone end groups, the prepolymer can be cross-linked through the interaction of the triple bonds to form higher molecular weight polymeric enamine ketones or enonsulfides, as the case may be. Such ketones are also formed without cross-linking where equivalent amounts of the initial prepolymers and diamines or dithiols are reacted together. The enamine ketones of the invention are characterized by the following general formula:

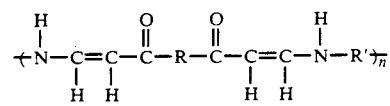

Enonesulfides of the invention are characterized by the general formula:

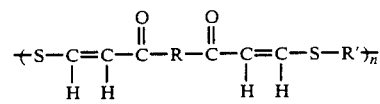

where R is alkylene, cycloalkylene, alkylene ether and combinations thereof, and where R' is alkylene, cycloalkylene, arylene and combinations thereof and may contain functional side groups, saturated or unsaturated, and which may also contain cyano, halogen or other functional components, and "n" is a whole number.

Activation of the triple bonds will depend upon the nature of the compounds undergoing cures but generally takes place at a temperature of from about 50° C. to about 150° C., about 100° C. being typical. Ordinarily from about 3 to 4 hours is required to substantially complete cure of the prepolymers.

The number of cross-link sites present in the final cross-linked enamine-ketone or enonsulfide polymer has an important bearing on the physical properties of the product. In this regard, the amount of the diamine or dithiol relative to that of the bispropynone determines the molecular weight of the prepolymer, and the molecular weight of the prepolymer, in turn, determines the number of cross-link sites present in the final polymeric product. In this connection, it has been found that to produce elastomeric polymeric products, substantially less than one cross-link site per about 1500–2000 molecular weight of the polymeric product desired is required. On the other hand, if there is substantially more than one cross-link site present per about 1500–2000 molecular weight of the polymeric product, a semi-rigid material is produced.

Techniques for determining such cross-link sites can be found in Prime, R. B., Thermal Characterization of Polymeric Materials, E. A. Turi, Ed., Academic Press, N.Y., 1981, p. 507.

In instances where no substantial amounts of cross-links exist, for instance in the two-step reaction, where equivalent amounts of the initial prepolymer are reacted with a diamine or dithiol in the second step, the polymeric product obtained is a thermoplastic material.

The products of the invention will exhibit a glass transition temperature, $T_g$, of about $-60°$ to about $+60°$.

In the case of the polymers prepared from Ethacure and Unilink diamines, the polymeric products typically show a 5% weight loss in either air or nitrogen at about 200° C. to about 300° C. In the case of polymeric products made from the butyl nitrile rubbers, the 5% weight loss value experienced is in the range of from about 250° C. to about 360° C.

The polymers of the invention also show good solvent resistance, thus lending themselves to use as tank linings since they can be sprayed on the interior surface of a tank as a high-solids solution, and then cured in place.

In summary, and as disclosed in the preceding, in the two-step process, the polymeric products of the invention can be maintained in a liquid state until it is desired to transform them into a solid polymer state by cross-linking. With respect to conversion of the liquid system to the solid state in the case where substantially molar equivalent amounts of the initial prepolymer and the dithiol or diamine are mixed, relatively few triple bonds are present to cure, and a solid is produced merely by molecular extension of the prepolymer resulting from mixing the two components. In cases where substantially less than molar equivalent amounts of dithiol or diamine relative to the prepolymer present are added, curing is required to cause interaction of the triple bonds and conversion of the liquid components to a solid polymer.

A further embodiment of the invention comprehends the formation of copolymers from the enamine ketone or enonsulfide products described in the preceding. Such copolymers are formed by reacting unsaturated, vinyl-type monomers, for example, vinyl chloride, acrylonitrile, acrylates such as methyl methacrylate, styrene, their derivatives, or other similar monomers with such products. The copolymers may be formed by co-polymerizing the products with the aforesaid monomers in the presence of suitable initiators such as, for instance, benzoyl peroxide; azoisobisbutyronitrile, AIBN; or others. The double bonds of the monomers interact with the unsaturation present in the products to form a variety of useful copolymers. Addition of the monomer is carried out following formation of the enamine ketone or the enonsulfide prepolymers to form polymeric products having cross-linked networks that are useful in a variety of applications.

As indicated, the polymeric products of the invention lend themselves to a wide variety of applications, including reaction injection molding processes, the formation of composites, the preparation of adhesive systems, use as tank linings, and to a wide variety of other applications in which it is desirable for the reacting components to remain in a liquid state until transferred to a location at which solidification is required. In addition, since the solid products are formed from solvent-free components, the presence of voids in the final solid product is eliminated.

While not intended to be limiting in nature, the following examples are illustrative of the invention.

EXAMPLE 1

A 100 ml. resin kettle is equipped with an addition funnel, an overhead stirring assembly, and a nitrogen inlet. To the vessel is added 6.1350 gms., 0.0378 moles, of adipoly diethynyl diketone, and 40 mls. of methylene chloride. Thereafter, 5.8772 gms., 0.0198 moles, of Unilink 4200 is added in two 15 mls. portions over a 3 hour period, with an 18 hour interval between additions. The reaction proceeds at ambient temperature for 32 hours, at which point the solvent is removed under reduced pressure. A brown liquid oil is obtained, which is subsequently stored at 5° C. to minimize cross-linking of the ethynyl ketone end groups.

Subsequently, a portion of the prepolymer is cured in a one-step procedure at 100° C. for 3 hours, followed by post-curing at 130° C. for 1 hour. The resulting polymer is a solid, thermoset material, dark reddish-brown in color, and is shown to have a molecular weight between cross-links, $M_c$, of about 635.

EXAMPLE 2

In another experiment, the resin kettle of Example 1 is charged with 9.7418 gms., 0.015 moles, of the Unilink based prepolymer of Example 1, dissolved in 20 mls. of methylene chloride. In a second step, 10 mls. of methylene chloride containing 0.6986 gms., 0.0022 moles, 0.15 equivalents, of Unilink 4200 is added to the kettle, and the solution is stirred for about 0.5 hours. The solvent is then removed from the liquid solution under reduced pressure, and the resulting oil is placed in a mold and cured at 100° C. for 3 hours, followed by a subsequent cure at 130° C. for 1 hour. The polymer produced possesses an $M_c$ of less than 1500.

EXAMPLE 3

Subsequently, systems containing 0.25 and 0.50 equivalents, respectively, of Unilink are prepared in the manner of Example 2. The thermoset polymers resulting from the experiment have $M_c$'s ranging from about 800 to 1500, and are semi-rigid, reddish-brown, solid polymeric materials.

EXAMPLE 4

In another experiment, a 100 ml resin kettle equipped with an additional funnel, an overhead stirring assembly, and a nitrogen inlet is charged with 12.2541 gms., 0.0193 moles, of the Unilink-based prepolymer of Example 1, and 30 mls. of methylene chloride. A 20 ml. solution of methylene chloride containing 0.4546 gms., 0.0048 moles, 0.25 equivalents of 1,2-ethane dithiol is then added, and the solution is stirred for approximately 0.5 hours. The solvent is thereafter removed under reduced pressure, and the resulting oily liquid is placed in a mold and cured at 100° C. for 3 hours, followed by subsequent curing at 130° C. for 1 hour. The resulting thermoset polymer is reddish-brown in color, has an $M_c$ of about 820, and a $T_g$ above room temperature.

EXAMPLE 5

In a further experiment, the 100 ml. resin kettle of the preceding examples has added thereto 1.9130 gms., 0.0118 moles, of adipoyl diethynyl diketone, and 20 mls. of methylene chloride. 50 mls. of methylene chloride containing 11.5351 gms., 0.0059 moles, of a butyl nitrile rubber, Hycar 1300 X16, manufactured by the B. F. Goodrich Company, is then added in two 25 mls. portions over a 3 hour period, with an 18 hour interval between additions. The reaction proceeds at ambient temperature for 32 hours, at which time 40% by volume of the solvent is removed under reduced pressure. The resulting solution is then poured onto 8 inch glass plates, and the solvent stripped therefrom by vacuum treatment.

The films are subsequently cured in a one-step process employing a curing temperature of 100° C. for 2 hours, followed by a subsequent cure at 130° C. for 1 hour, and a still further cure at 150° C. for 1 hour. The reddish-brown elastomers produced display $M_c$'s of 2300 to 2900; they are elastomeric and show $T_g$'s by Differential Scanning Clorimeter of below 45° C.

EXAMPLE 6

In yet another experiment, a 250 ml. flask equipped with an addition funnel, an overhead stirring assembly, and a nitrogen purge is charged with 8.3888 gms., 0.132 moles, of the Unilink prepolymer of Example 1 in 30 mls. of methylene chloride. In a second step, 12.90 gms., 0.0066 moles, 0.5 equivalents of Hycar 1300 X16 in 50 mls. of methylene chloride is added in two 25 ml. portions over a 3 hour period, with an 18 hour interval between additions. The reaction is continued for 36 hours at ambient temperature, after which 40% by volume of the solvent is removed under reduced pressure. The resulting solution is thereafter poured onto 8 inch glass plates, and the solvent stripped off under vacuum. The films are cured as is, and are also cut and cured in a compression mold to yield a three-dimensional sample.

EXAMPLE 7

The experiment of Example 6 is also carried out using 0.25 equivalent and 1 equivalent, respectively, of Hycar 1300 X16, as well as 0.25 equivalents, 0.5 equivalents, and 1 equivalent, respectively, of Hycar 1300 X21, the latter being another butyl nitrile rubber sold by the B. F. Goodrich Company. The curing cycle for the experiment which employs ratios of equivalents, Hycar to prepolymer, of less than 1 includes heating at 100° C. for 2 hours, followed by heating at 130° C. for 1 hour, and finally heating at 150° C. for 1 hour. The material made with 1 equivalent of Hycar displays thermoplastic properties, while those made with less than that amount exhibit elastomeric properties. The elastomeric materials show $T_g$'s ranging from $-50$° C. to 13° C., as measured by a Differential Scanning Calorimeter, and have $M_c$'s greater than 3000 gms. per mole. The thermoplastics made by employing 1:1 equivalents, Unilink/Hycar, can be compression molded several times at 80° C. for 2.5 hours. The thermoplastics based on the Hycar's have $T_g$'s lower than $-40$° C., and are tough, rubbery materials.

EXAMPLE 8

In another experiment, a 250 ml. flask equipped with an overhead stirring assembly, and a nitrogen purge is charged with 10.2511 gms., 0.016 moles, of the Unilink prepolymer of Example 1 in 80 mls. of m-cresol. In a second step, 2.8786 gms., 0.016 moles of Ethacure 100 in 20 mls. of m-cresol is slowly added over a period of 5 minutes. The reaction is continued overnight at ambient temperature. The resulting solution is then slowly added to 1 liter of ethyl ether with vigourous stirring, and the liquid solution subsequently decanted, leaving the polymer adhered to the sides of the container.

The polymer is thereafter redissolved in methylene chloride, and re-precipitated in ether to produce an orange-colored polymer. The somewhat sticky polymer is dried in a vacuum oven overnight at 60° C. Upon examination, the polymer is found to have an intrinsic viscosity of 0.75 (0.5 gms. in m-cresol), a $T_g$ of 72° C. (from DSC), a $\overline{M}_w/\overline{M}_n$ of 3.67, a $\overline{M}_w$ of $1.6 \times 10^4$ (GPC), and a 5% weight loss of 270° C. in nitrogen and 255° C. in air. The flexural modulus is 1.46 GPa, and the material has a fracture energy of 0.145 KJ/m².

EXAMPLE 9

The procedure of Example 8 is also carried out using Ethacure 300, rather than Ethacure 100. The polymer is found to have an intrinsic viscosity of 0.82, a $T_g$ of 77° C. (DSC), a $\overline{M}_w/\overline{M}_n$ of 3.94, a $\overline{M}_w$ of $1.14 \times 10^4$ (GPC), and a 5% weight loss of 278° C. in nitrogen and 263° C. in air. The flexural modulus is 1.3 GPa, and the fracture energy is 0.012 KJ/m².

EXAMPLE 10

A copolymer is made from an enamine ketone prepolymer of the invention in the following manner. To a 100 ml. resin kettle equipped with overhead stirring assembly, a nitrogen inlet, and a reflux condenser is added 60 mls. of methylene chloride; 0.18 gms., 0.0011 moles of AIBN; 20 gms., 0.19 moles of styrene; and 3 gms., 0.005 moles of the Unilink prepolymer of Example 1. The mixture is heated for 2 hours, and the solvent is then removed under reduced pressure to yield a light brown copolymer gel which has a $T_g$ (DSC) of about 100° C.

While in accordance with the patent statutes, a preferred embodiment and best mode has been presented, the scope of the invention is not limited thereto, but rather is measured by the scope of the attached claims.

What is claimed is:

1. A method for synthesizing enamine ketone and enonesulfide polymers comprising initially preparing a liquid propynone-terminated prepolymer compound by reacting a bispropynone having the formula

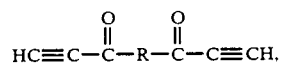

where R is selected from the group consisting of alkylene, cycloalkylene, alkylene ether and combinations thereof, with a member of the group consisting of a liquid diamine compound and a liquid dithiol compound, said prepolymer compound having an intrinsic viscosity no greater than about 0.6, and said diamine compound being selected from the group consisting of diamine compounds having the formula

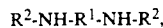

where $R^1$ is selected from the group consisting of alkylene, arylene, branched alkylene, alkylene ether, and combinations thereof, and $R^2$ is selected from the group consisting of alkyl or hydrogen and may be the same or different; and

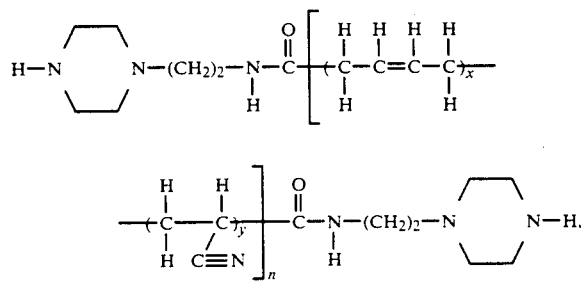

where n is a whole number and x=1, y=0–0.5, indicating the relative abundance of the two groups in the bracketed unit; and said dithiol compound having the formula

where $R^3$ is selected from the group consisting of alkylene, arylene, branched alkylene, alkylene ether, and combinations thereof, and subsequently cross-linking said prepolymer compound in the absence of solvent by causing acetylene end groups of said prepolymer compound to interact to form cross-links, thereby producing a desired polymeric product having a glass transition temperature no greater than about 60° C.

2. A method for synthesizing enamine ketone and enonesulfide polymers comprising initially preparing a liquid propynone-terminated prepolymer compound by reacting a bispropynone having the formula

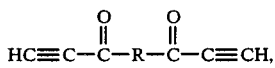

where R is selected from the group consisting of alkylene, cycloalkylene, alkylene ether and combinations thereof, with a member selected from the group consisting of a liquid diamine compound and a liquid dithiol compound, said prepolymer compound having an intrinsic viscosity no greater than about 0.6, and said diamine compound being selected from the group consisting of diamine compounds having the formula

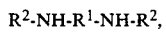

where $R^1$ is selected from the group consisting of alkylene, arylene, branched alkylene, alkylene ether, and combinations thereof, and $R^2$ is selected from the group consisting of alkyl or hydrogen and may be the same or different; and

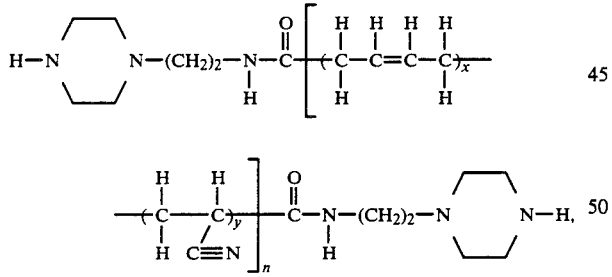

where n is a whole number and x=1, y=0–0.5, indicating the relative abundance of the two groups in the bracketed unit; and said dithiol compound having the formula

HS-$R^3$-SH, where $R^3$ is selected from the group consisting of alkylene, arylene, branched alkylene, alkylene ether, and combinations thereof, and thereby forming said prepolymer compound as a stable intermediate product, and
    thereafter reacting said prepolymer compound with an additional amount of a member of said group of a liquid diamine compound and a liquid dithiol compound to produce a desired polymeric product.

3. A process according to claim 2 wherein the relative molar equivalent amounts of said prepolymer compound and said additional amount of said member are substantially equal, and the polymeric produced is a thermoplastic material.

4. A claim according to claim 2 wherein R is a member selected from the group consisting of —(CH$_2$)$_4$— and —(CH$_2$)$_8$—.

5. A method according to claim 4 wherein said member is —(CH$_2$)$_4$—.

6. A method for synthesizing an enamine ketone polymer comprising initially preparing a liquid propynone-terminated prepolymer compound by reacting a bispropynone having the formula

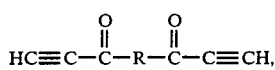

where R is selected from the group consisting of alkylene, cycloalkylene, alkylene ether and combinations thereof, with a member selected from the group consisting of a liquid diamine compound, said prepolymer compound having an intrinsic viscosity no greater than about 0.6, and said diamine compound being selected from the group consisting of diamine compounds having the formula

where $R^1$ is selected from the group consisting of alkylene, arylene, branched alkylene, alkylene ether, and combinations thereof, and $R^2$ is selected from the group consisting of alkyl or hydrogen and may be the same or different; and

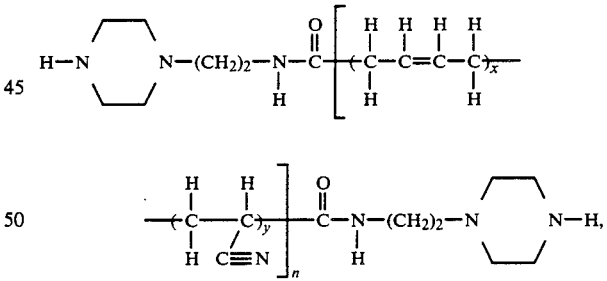

where n is a whole number and x=1, y=0–0.5, indicating the relative abundance of the two groups in the bracketed unit;

isolating said prepolymer compound as a stable intermediate product, and
    thereafter reacting said prepolymer compound with a compound having the formula

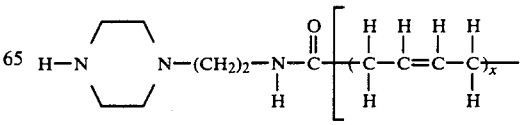

-continued

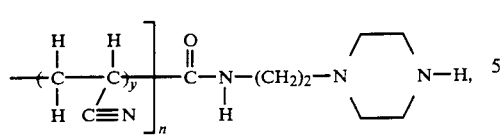

where n is a whole number and x=1, y=0-0.5, indicating the relative abundance of the two groups in the bracketed unit; to produce a desired polymeric product.

7. A method according to claim 6 in which said diamine compound has the formula

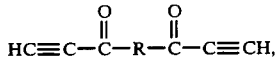

in which $R^1$ is —$(CH_2)$—, and $R^2$ is alkyl and may be the same or different.

8. A method for synthesizing enamine ketone and enonesulfide polymers comprising initially preparing a liquid propynone-terminated prepolymer compound by reacting a bispropynone having the formula

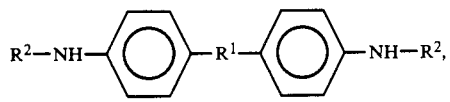

where R is selected from the group consisting of alkylene, cycloalkylene, alkylene ether and combinations thereof, with a member selected from the group consisting of a liquid diamine compound and a liquid dithiol compound, said prepolymer compound having an intrinsic viscosity no greater than about 0.6, and said diamine compound being selected from the group consisting of diamine compounds having the formula

where $R^1$ is selected from the group consisting of alkylene, arylene, branched alkylene, alkylene ether, and combinations thereof, and $R^2$ is selected from the group consisting of alkyl or hydrogen and may be the same or different; and

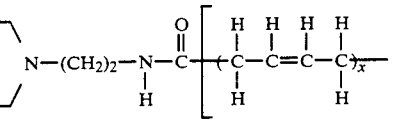

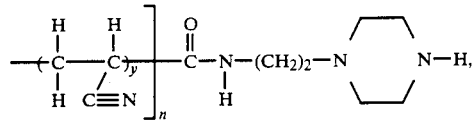

where n is a whole number and x=1, y=0-0.5, indicating the relative abundance of the two groups in the bracketed unit; and said dithiol compound having the formula

where $R^3$ is selected from the group consisting of alkylene, arylene, branched alkylene, alkylene ether, and combinations thereof;
  isolating said prepolymer compound as a stable intermediate product;
  reacting said prepolymer compound with an additional amount of a member of said group of liquid diamine compound and liquid dithiol compound to produce a desired polymer, and
  subsequently cross-linking said polymer by causing acetylene end groups in said polymer to interact to form cross links.

9. A process according to claim 8 wherein the amount of said liquid bispropynone reacted with said member of the group of liquid diamine compound and liquid dithiol compound is empirically controlled so that the molecular weight of the polymer formed after the reaction with said additional amount of said member provides a polymeric product having less than about one cross-link site per 2,000 molecular weight, and the polymeric product produced is an elastomeric material.

10. A process according to claim 8 wherein the amount of said bispropynone reacted with said member of the group of said liquid diamine compound and liquid dithiol compound is empirically controlled so that the molecular weight of the polymer product formed after the reaction with said additional amount of said member provides a polymeric product having less than about one cross-link site per 1,500 molecular weight, and the polymeric product produced is a semi-rigid material.

11. A reaction injection molding process in which a liquid propynone-terminated prepolymer compound prepared according to claim 2 is mixed with said additional amount of said member, and the mixture is injected into a mold.

12. A reaction injection molding process according to claim 11 in which said mixture is cross-linked in said mold by the application of heat.

* * * * *